H. SHIIHARA.
FENDER FOR VEHICLES.
APPLICATION FILED JUNE 11, 1914. RENEWED SEPT. 23, 1916.

1,224,422.

Patented May 1, 1917.
2 SHEETS—SHEET 1.

WITNESSES

INVENTOR
HIROO SHIIHARA,
BY
ATTORNEYS

H. SHIIHARA.
FENDER FOR VEHICLES.
APPLICATION FILED JUNE 11, 1914. RENEWED SEPT. 23, 1916.

1,224,422.

Patented May 1, 1917.
2 SHEETS—SHEET 2.

WITNESSES

INVENTOR
HIROO SHIIHARA,
BY
ATTORNEYS

UNITED STATES PATENT OFFICE.

HIROO SHIIHARA, OF SEATTLE, WASHINGTON.

FENDER FOR VEHICLES.

1,224,422.  Specification of Letters Patent.  Patented May 1, 1917.

Application filed June 11, 1914, Serial No. 844,494. Renewed September 23, 1916. Serial No. 121,902.

*To all whom it may concern:*

Be it known that I, HIROO SHIIHARA, a citizen of the Empire of Japan, and a resident of Seattle, in the county of King and State of Washington, have invented a new and Improved Fender for Vehicles, of which the following is a full, clear, and exact description.

Among the principal objects which the present invention has in view are: to provide a fender of the character mentioned with means for attachment to the axle of a wheel supporting structure; to provide means for at will elevating the fender to avoid obstructions incident to the road; and to provide means for avoiding wrecking the fender when disposed in service position.

Figure 1:
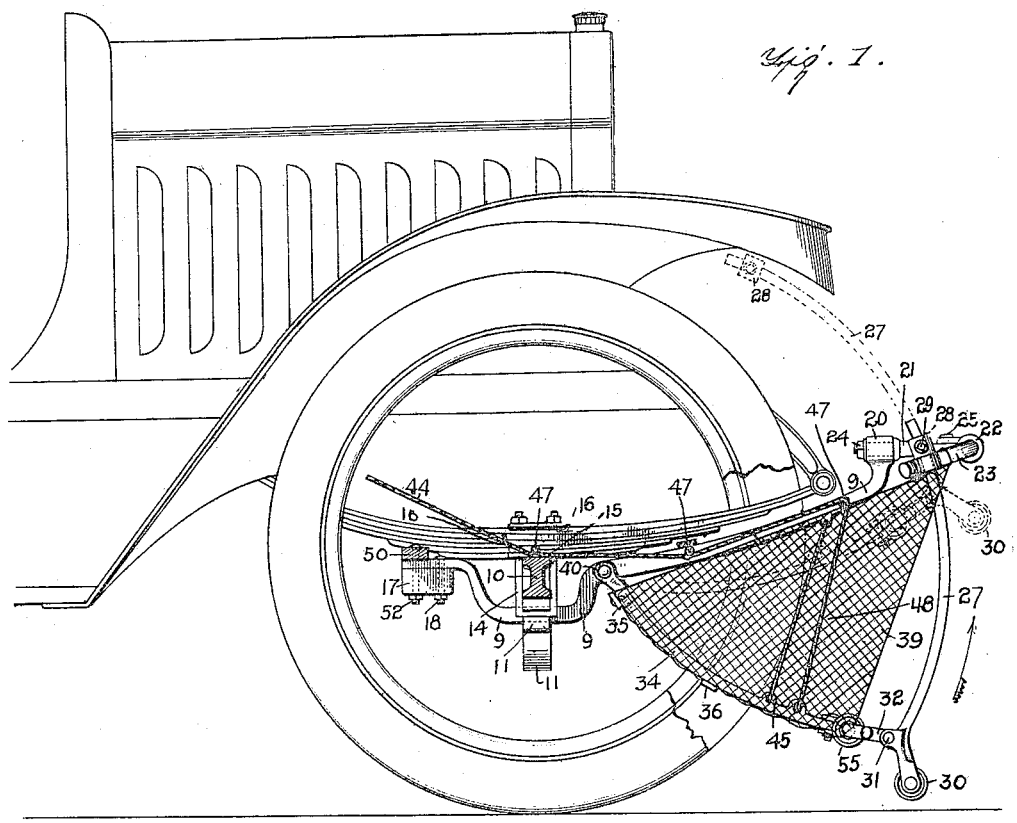
Figure 2:
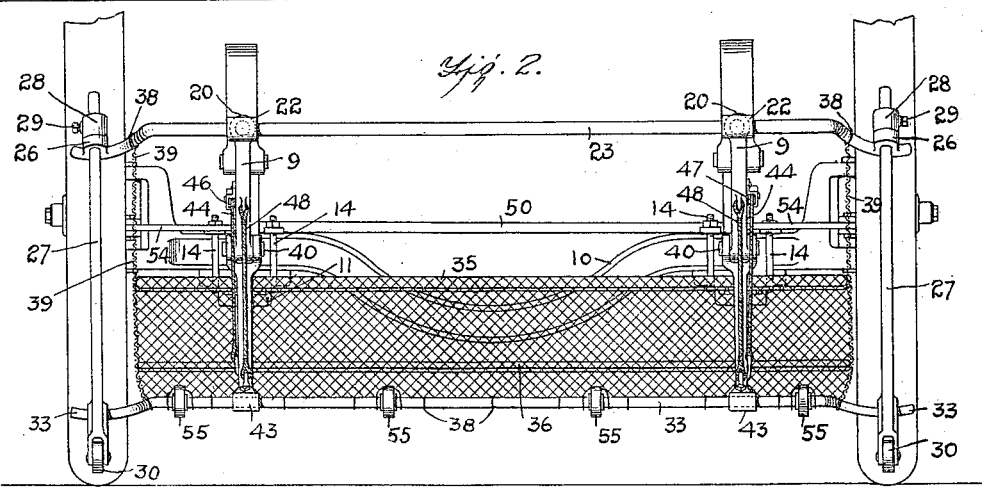
Figure 3:
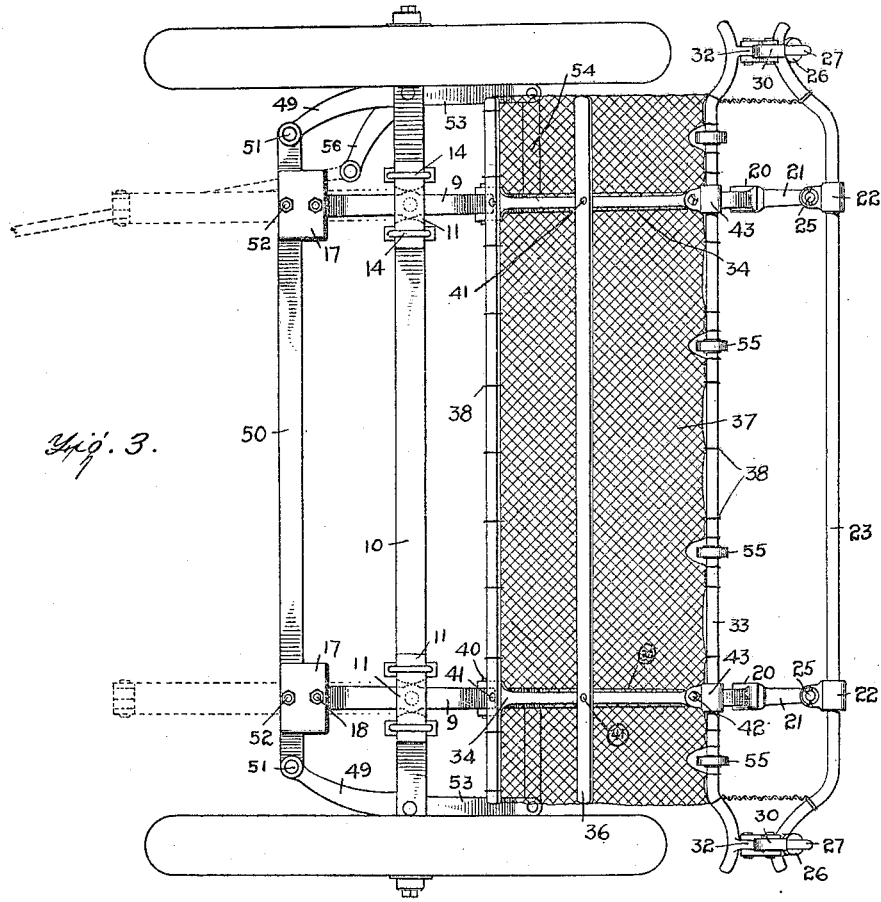
Figure 4:
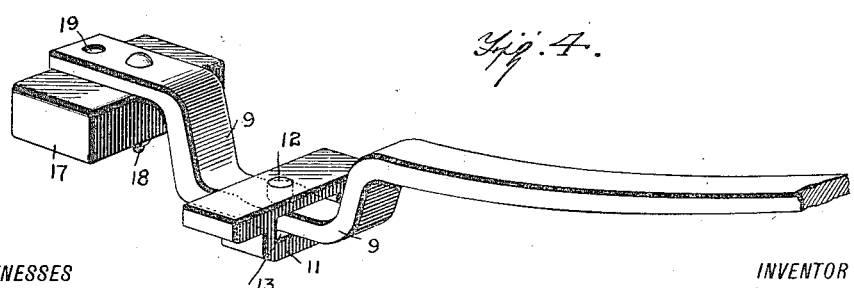

One embodiment of the present invention is shown in the accompanying drawings, in which, Figure 1 is a side view of a fender constructed and arranged in accordance with the present invention, the same being shown in conjunction with the forward section of an automobile of conventional character, the dotted lines shown in said figure indicate the lifted or normal position of the fender and parts connected therewith;

Fig. 2 is a front elevation of the same;
Fig. 3 is a bottom plan view of the same;
Fig. 4 is a detail view, on an enlarged scale, showing in perspective a bracket arm employed as a support for the fender.

While I have herein shown the invention in its application to automobiles, it will be understood that the same may be applied to various forms of vehicles, such as street cars, vans, or locomotives. Its adaptability, however, is particularly preferred in connection with automobiles, and to secure the bracket arms 9 to the front axle 10 thereof, I have provided clip blocks 11. The blocks 11 are suitably perforated to form bearings for pintles 12 provided on said bracket arms.
In the body of each clip block 11, there is formed a horizontal slot 13. The elongation of the slots 13 is provided to permit the bracket arms 9 to swing therein when rotated about the pintles 12.

The blocks 11 are attached to the axle 10 by means of end-threaded stirrups 14, the upper ends of which are extended through anchor plates 15, to be there held by nuts 16. When the nuts 16 are tightened, the blocks 11 are held rigidly on the axle 10.

To balance the weight carried on the forward section of the bracket arms 9, each arm is provided with a suitable weight 17. The weights 17 are secured to the rear extension of the arm 9 by means of a bolt 18, to hold which the rear extension of the bar 9 is provided with a series of holes 19. By employing the holes 19 to vary the distance between the weight 17 and the blocks 11, the effectiveness of the weight 17 may be increased or diminished. It is the purpose at all times to shift the weight 17 to balance the weight carried by the bracket arms 9 forward of the axle 10.

At the forward end of each of the bracket arms 9, a head 20 is formed. Each of the heads 20 is bored to form a bearing for guide posts 21. The posts 21 are each provided at the outer end with a bearing to pivot clips 22, through which is passed a buffer rail 23. Said posts are held immovable by tightening nuts 24 at the back of the heads 20.

The clips 22 are pivotally mounted at the forward ends of the posts 21 by means of pins 25 (see Fig. 3 of the drawings). By means of this construction, it will be seen that the rail 23 and parts connected therewith are allowed a slight lateral swing, provided to avoid cramping of any of the structural elements.

The outer ends of the rail 23 are rearwardly curved and adjacent the extreme ends thereof, are provided with lugs 26, bored to form bearings for guide rods 27. The guide rods 27 are each provided adjacent the upper end with a sliding block 28. The blocks 28 are each positioned on the rods 27 by means of a set screw 29. By employing the blocks 28, the working position of the rods 27 is determined. Preferably this is such as would hold the wheels 30 slightly above the roadbed. It will be understood that the wheels 30 are provided to avoid wrecking the fender or parts connected therewith should the lower end of the rods 27 or fender touch the ground. With the wheels 30 in place, the rod would be lifted over any slight obstruction. The guide rods 27 are each pivotally secured by means of pins 31 to lugs 32, said lugs being extended from the fender cross bar 33.

The cross bar 33, the side arms 34, and the slats 35 and 36 constitute the frame upon which a net 37 is stretched and to the cross bar 33 and slat 35 whereof said net is secured by anchoring rings 38. The lateral ends of the net 37 are shaped to form sides 39 to prevent the body of a person resting on the net 37 from being ejected laterally from the fender. The upper end of each of the sides 39 is supported by a rail 23, as seen best in Figs. 1 and 2 of the drawings. The attached upper end of each of the sides 39 is at all times stationary, irrespective of the movement of the arms 34.

The arms 34 are pivotally mounted by means of pins 40, upon the arms 9. Said arms are held in parallel relation by the slats 35 and 36 to which they are connected by pins 41. Said arms are pivotally connected to the cross bar 33 by bolts 42 and clips 43, as best seen in Fig. 3 of the drawings. The object of the various flexible connections between the rail 23 and the arms 9, the bar 33 and the arms 34 is to permit these advance members of the structure to yield independently to shocks or blows received from obstacles on the roadbed over which the vehicle may be traveling.

The service position of the fender is that shown by full lines in Fig. 1 of the drawings. The normal position of the fender is that shown by dotted lines in the drawings. By lifting the arms 34, the fender is raised from service to safety position, removed from the path of obstacles encountered in the roadbed over which the vehicle is passing. To thus lift the arms 34, two cables 44 are provided. The cables 44 are each anchored to one of the side arms 34, an eyeleted lug 45 being provided on each of said arms. On the side of each arm 9 is mounted a pulley 47, over which the cables 44 are passed. The cables 44 are guided rearwardly by means of idle pulleys 47, one of said pulleys being conveniently mounted upon one of the anchor plates 15 holding the blocks 11 to the axle. The cable 44 may thus swing under the vehicle springs.

Any convenient means for anchoring the cables 44 adjacent the seat of the driver or chauffeur is employed, one requisite only being enforced; to wit, that the means for attachment are rapidly released to permit the bar 33 and net 37 connected therewith to drop to the position shown in Fig. 1 of the drawings. To partially relieve the shock of dropping the lower frame holding the net 37, I provide a plurality of short cables 48, which, in conjunction with the guide rods 27 and the blocks 28 thereon, constitute the carrying support for the lower frame when in service position. The short cables 48 fold naturally when the lower frame is lifted to the normal position shown in Fig. 1 of the drawings.

It is the purpose of the present invention to maintain the fender at all times in the path to be followed by the vehicle, and extended in a path parallel with the planes of the steering wheels of the vehicle. For this purpose, the arms 9 are pivotally connected each to the other and to the rear end of a knuckle arm 49, by means of a tie bar 50. The tie bar 50 is connected to the arm 49 by means of a pivot pin 51, and to each of the arms 9 by a bolt 52, as seen best in Fig. 3 of the drawings. Above one of the knuckle arms 49, an arm 56 is connected to the drag link of the steering gear of an automobile. A third arm 53 is connected to the knuckle of each of the steering wheels, the forward end of said arm 53 being connected by a link 54 to the adjacent arm 9. This construction is omitted when the fender is applied to old vehicles.

By reason of the above construction, the net 37 is permitted to approximately fill the entire space between the steering wheels and to shift in correspondence therewith when the wheels are turned or rotated on the knuckles supporting the bearings of said wheels. When the arm 52 is operated upon by the steering gear, the arms 49 and 53 are shifted. The links 54 move the arms 9 on their pintles 12 to maintain said arms 9 in parallel relation to the planes of the steering wheels. By this means the necessity for limiting the width of the fender is avoided.

In the operation of the vehicle, when constructed and arranged in accordance with the present invention, the cross bar 33 and net 37 are dropped whenever the chauffeur apprehends danger, by releasing the cables 44. If the chauffeur desires, while operating in a danger zone, such as one much frequented by children, or where the traffic is heavy, he may drop the fender to operative or service position. When, after passing out of the danger zone, or after passing the danger point, he desires to lift the fender, all that it is necessary to do is to draw upon the cables 44, when the arms 34 and parts connected therewith will be lifted to the position shown by the dotted lines in Fig. 1 of the drawings.

If, when the fender is dropped or is carried in the lowered position, an obstacle strikes the cross bar 33, the same is lifted over the wheels 55 with which it is provided.

Claims:

1. A fender, comprising a supporting frame having a plurality of supporting arms arranged for pivotal mounting on a relatively fixed axle; a swinging frame pivotally mounted on said supporting frame to drop below the same to form a forwardly-opening scoop; a hoisting mechanism permanently attached to the swinging frame and operable from the driver's seat; and means connecting said frames for guiding the relative movements thereof.

2. A fender, comprising a supporting frame embodying two horizontally forwardly-extending arms; pivot blocks for said arms to permit the same to swing horizontally and not vertically; means connecting said arms to maintain the same in parallel relation; a drop scroop frame mounted on said arms; and weights mounted on said arms, at the rear of the pivots thereof, to balance the weights of the forward portion of said arms and parts carried thereby.

3. A fender, comprising a supporting frame embodying a plurality of supporting arms; pivot blocks for said arms to provide for horizontal movement thereof; a drop scoop frame mounted on said arms opening forwardly and between the steering wheels of a vehicle; weights mounted on said arms to counter-balance the forward extension of said arms and frame carried thereby; and means for maintaining said arms in parallel relation to the vehicle wheels between which they are mounted.

4. A fender, comprising a supporting frame embodying a plurality of supporting arms; pivot blocks for said arms to provide for horizontal movement thereof; a drop scoop frame mounted on said arms opening forwardly and between the steering wheels of a vehicle; weights mounted on said arms to counter-balance the forward extension of said arms and frame carried thereby; means for maintaining said arms in parallel relation to the vehicle wheels between which they are mounted; and a buffer rail pivotally mounted on said arms, in advance thereof, said rail being adapted to move in a horizontal plane.

In testimony whereof I have signed my name to this specification in the presence of two subscribing witnesses.

HIROO SHIIHARA.

Witnesses:
M. H. Cook,
W. S. Osborn.

Copies of this patent may be obtained for five cents each, by addressing the "Commissioner of Patents, Washington, D. C."